No. 834,859. PATENTED OCT. 30, 1906.
J. S. YOUNG.
TRANSPORTATION TICKET.
APPLICATION FILED JAN. 17, 1906.

WITNESSES:
D. C. Walter
C. H. Clement

INVENTOR.
Joseph S. Young,
By Owen & Owen,
his attorneys.

UNITED STATES PATENT OFFICE.

JOSEPH S. YOUNG, OF TOLEDO, OHIO.

TRANSPORTATION-TICKET.

No. 834,859.   Specification of Letters Patent.   Patented Oct. 30, 1906.

Application filed January 17, 1906. Serial No. 296,574.

*To all whom it may concern:*

Be it known that I, JOSEPH S. YOUNG, a citizen of the United States, and a resident of Toledo, in the county of Lucas and State of Ohio, have invented certain new and useful Improvements in Transportation - Tickets; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to that class of transportation-ticket which are generally known as "conductor's cash-fare receipts" and which are more especially designed for use in interurban traffic on trolley-lines and the like on which the passengers pay a cash fare directly to the conductor. As the amount of fare paid varies with the distance traveled, some sort of a check is necessary which will compel the conductor to account to the company for the entire amount collected, and thus act as a safeguard against the perpetration of fraud on the company by dishonest conductors.

The object of my invention, therefore, is the provision of a ticket which has the names of the stations and the varying amounts of fare-numerals so arranged thereon and the passenger's receipt and auditor's check so combined as to prevent the improper manipulation of the ticket by the conductor except when in collusion with the passenger for the purpose of defrauding the company.

The invention is fully described in the following specification and illustrated in the accompanying drawings, in which—

Figure 1 is a view of the face of the ticket comprising my invention as it appears bound in book form. Fig. 2 is a similar view thereof with the portion representing the passenger's receipt torn off, and Fig. 3 is a view of the complete ticket with the upper half thereof turned back.

The ticket comprising my present invention consists of a single sheet, as shown in Fig. 3, which is folded upon itself along the line $a$ to form the upper half A and the lower half B. The half A, in addition to the data usually placed on tickets of this character designating the number of the ticket, the name of the company, &c., contains adjacent its right or free edge a column of the names of the stations occurring between the terminals of the road or a proper subdivision thereof, and intermediate of said column of station-names and the inner or connected edge of the such half it contains two duplicate parallel columns of fare-numerals, which are arranged longitudinally of the sheet, as is also the column of station-names, and are shown on the drawings as ranging from five cents to one dollar.

The duplicate columns of numerals are separated from each other by a perforated or weakened line $b$, which extends the entire length of the ticket and divides the half A into two sections $c$ and $d$, the section $c$ bearing the names of the stations and one column of fare-numerals and the section $d$ bearing the other column of fare-numerals, as shown in Fig. 1. Suitable wording to indicate that the detachable section $c$ is the passanger's receipt and the section $d$, which remains attached to the half B of the ticket, is the auditor's check or conductor's stub and directions to the conductor and passenger may appear on the face of the ticket, as shown; but these directions form no essential element of my invention. The lower half B of the ticket is left blank, except for a column of station-names the same as appears in the half A of the ticket, which names have the same positions on the half B as the like names on the half A, so as to enable a single operation of the punch to perforate the same name on both halves. Each list of stations is shown as being longitudinally divided by a line $e$, one side of which is marked "From" and the other side "To" to enable the ticket to be punched to designate the direction in which the passenger is riding.

In binding the tickets in book form a staple S or other suitable securing means is passed through the section $d$ of the halves A and through the halves B at one end of the tickets, as shown in Figs. 1 and 2, and the portion of a ticket remaining in the book after the passenger's receipt has been torn therefrom is separated from its stub along the perforated line $g$, which extends transversely of the section $d$ and half B of the ticket, as shown.

The manner of using the ticket thus constructed and arranged is as follows: Should the passenger ride from Toledo to Mermill and pay a fare of fifty-five cents for such ride, the conductor inserts the two halves of the ticket between the jaws of his punch and punctures the word "Toledo" at the left of the divisional line e and the word "Mermill" at the right of such line and then punches the numerals corresponding to the amount of fare paid. The perforating of the two columns of fare-numerals is done at one operation by the use of a suitable punch specially made for that purpose, which punch, as shown by the perforations in the drawings, is designed to perforate the numeral in the left-hand column and to make a V-shape cut in the like numeral in the other column, which cut extends outwardly from the perforated line b and points toward the outer edge of the section c. It will thus be seen that after a ticket has been properly punched and the section c thereof torn off to be delivered to the passenger an ear h will remain on the edge of the section d and a corresponding notch provided in the edge of the section c or passenger's receipt, thereby designating the amount of fare paid. The punch-mark i in the column of numerals on the section d is designed to designate to the auditor the amount collected by the conductor should the ear be torn off by mistake or otherwise.

In folded ticket of this class it has been customary to make each half of the ticket in duplicate form, one half representing the passenger's receipt and the other half the auditor's check or stub. Difficulty has arisen in the use of such tickets, due to the fact that each half contains corresponding columns of station-names and fare-numerals, thus rendering it possible for the conductor to differentially punch the two sections of the ticket by separately inserting the sections between the punch-jaws instead of punching through both sections at one operation of the punch, as is intended. In this way the conductor is enabled to falsify his reports to the company and to represent to it that he has received a less amount than that actually collected. With the form of ticket herein presented it is apparent that the conductor cannot without being in collusion with the passenger account to the company for an amount less than that actually collected, as the two columns of fare-numerals are both borne by the same half of the ticket, and the punch-marks therein are made simultaneously or at one operation of the punch, and the fare punch-mark on the passenger's receipt must therefore correspond to the fare punch-mark on the auditor's check, even though the conductor should separately and differentially punch the name in the station-columns of the two sections.

Having thus described my invention, what I claim as new, and desire to secure by Letters Patent, is—

1. A transportation-ticket, comprising a sheet folded upon itself, one section of which is provided with a column of station-names and duplicate parallel columns of numerals separated by a perforated or weakened line, one column of said numerals remaining on the portion bearing the column of station-names, and the other section bearing a column of station-names like those on the first section and registering therewith.

2. A transportation-ticket, comprising a sheet folded upon itself, both sections of which bear a column of corresponding station-names adjacent their outer edges, the names of one column registering with like names of the other column, and one section bearing two duplicate columns of numerals disposed between the column of station-names thereon and its inner edge and provided between the two columns of numerals with a perforated or weakened line which divides that section into two parts, substantially as described.

3. A transportation-ticket, comprising in combination two permanently-attached sections folded upon each other, one section bearing a column of station-names adjacent its outer or free edge, and the other section bearing a duplicate column of station-names to that borne by the first section and registering therewith and also bearing duplicate columns of numerals disposed between the column of station-names thereon and its inner edge, the numerals of one column being arranged opposite the like numerals of the other column, and the said other section being provided with a weakened or perforated line which separates the numeral-columns and divides the ticket into two separable parts, one part being designated to represent a passenger's receipt and including the column of station-names and one column of numerals borne by the perforated section, and the other part being designated to represent an auditor's check and including the remaining portion of the perforated section and the whole of the first-mentioned section.

In witness whereof I have hereunto signed my name to this specification in the presence of two subscribing witnesses.

JOSEPH S. YOUNG.

Witnesses:
CORNELL SCHREIBER,
C. W. OWEN